Aug. 17, 1926.
T. C. VAUGHN
1,596,261
PNEUMATIC ELEVATOR
Filed March 17, 1924  2 Sheets-Sheet 1
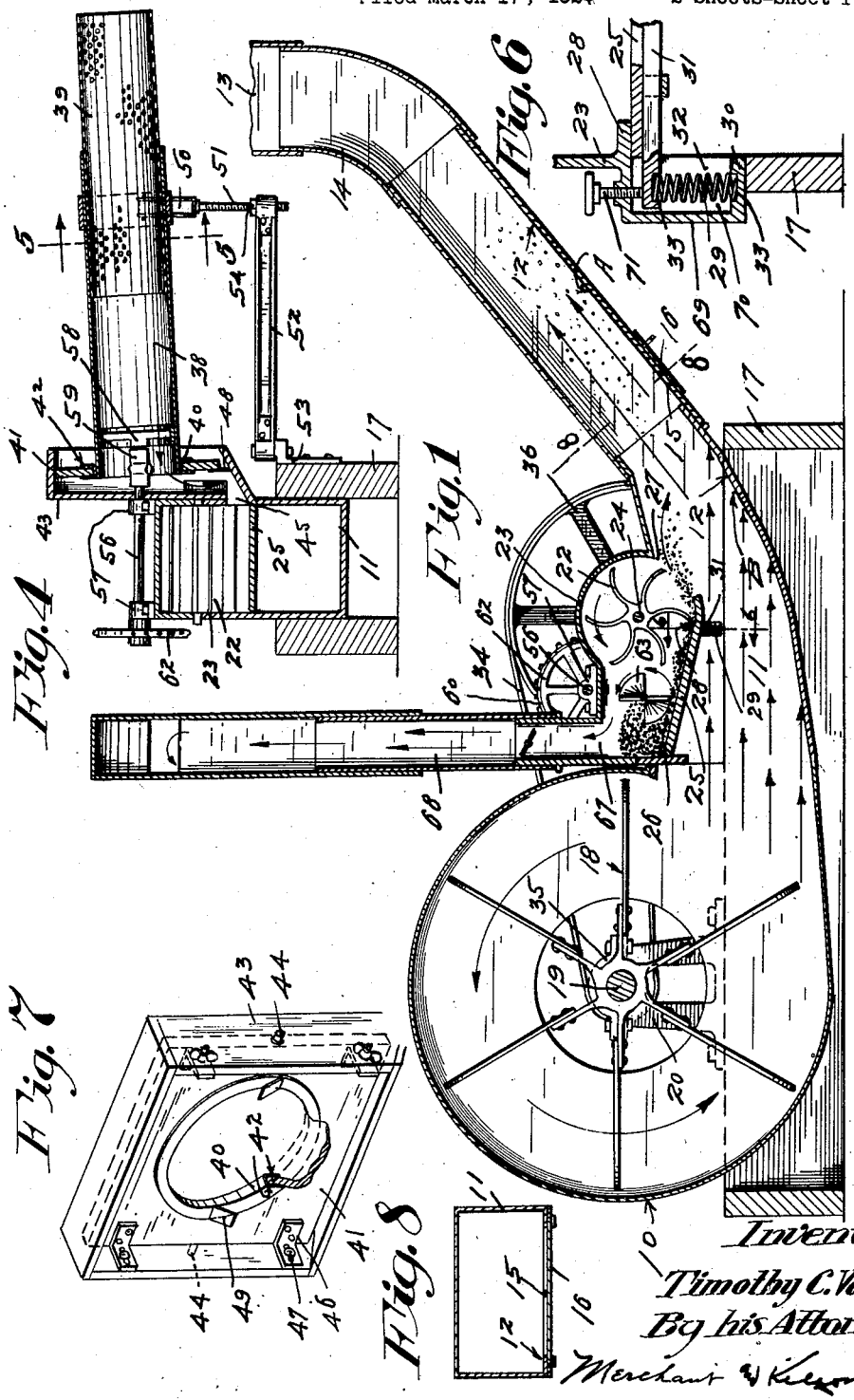
Inventor
Timothy C. Vaughn
By his Attorneys
Merchant & Kilson Aug. 17, 1926.
1,596,261
T. C. VAUGHN
PNEUMATIC ELEVATOR
Filed March 17, 1924   2 Sheets-Sheet 2
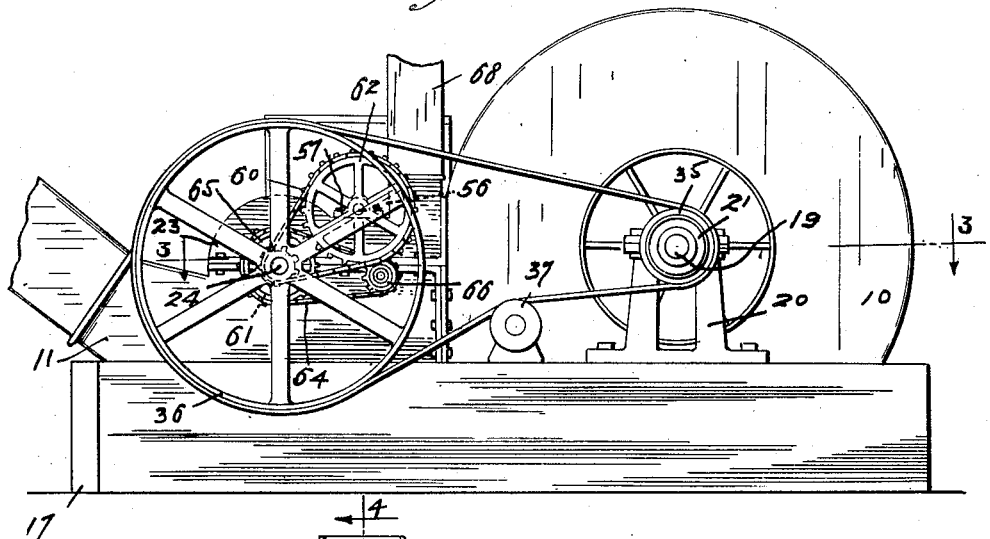
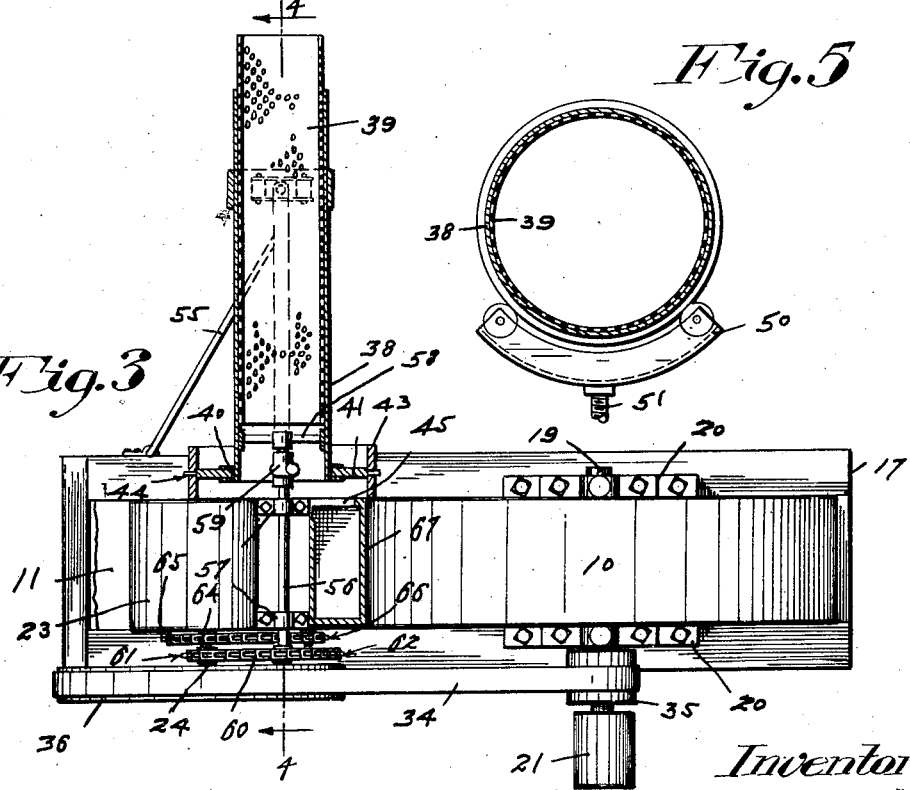
Inventor
Timothy C. Vaughn
By his Attorneys Patented Aug. 17, 1926.

1,596,261

UNITED STATES PATENT OFFICE.

TIMOTHY C. VAUGHN, OF MORRIS, MINNESOTA.

PNEUMATIC ELEVATOR.

Application filed March 17, 1924. Serial No. 699,881.

My present invention relates to improvements in pneumatic elevators for delivering grain into bins and the like, and has for its object to provide an extremely simple and highly efficient structure, as will hereinafter appear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a longitudinal vertical section showing the improved pneumatic elevator;

Fig. 2 is a left side elevation of the same;

Fig. 3 is a view partly in plan and partly in horizontal section taken on the line 3—3 of Fig. 2;

Fig. 4 is a view principally in transverse vertical section taken on the line 4—4 of Fig. 3;

Fig. 5 is a detail view with some parts sectioned on the line 5—5 of Fig. 4;

Fig. 6 is a detail view principally in section taken on the line 6—6 of Fig. 1;

Fig. 7 is a perspective view of the hopper box and joint plate; and

Fig. 8 is a transverse section taken on the line 8—8 of Fig. 1.

The numeral 10 indicates a cylindrical fan casing having at its bottom a tangential horizontally disposed discharge throat 11, the flat bottom of which is upwardly inclined away from said fan casing and affords a deck 12. A stack 13 is connected to the delivery end of the discharge throat 11 by an elbow 14. As shown, the upper section of the discharge throat 11 is made detachable from the lower section thereof, for the sake of convenience. It is important to note that the upper end portion A of the deck 12 has a greater inclination than the lower portion B thereof. It is also important to note that the deck 12 extends in front of the intake of the discharge throat 11 and above the top thereof. Formed in the upper section of the deck 12, near the lower end thereof, is a transverse grain release opening 15 normally closed by a sliding gate 16. The fan casing 10 and the connected lower section of the discharge throat 11 are mounted within a rectangular base 17 comprising side and end sills.

Within the fan casing 10 is an undershot fan 18, the shaft 19 of which is mounted in bearings 20 on the longitudinal sills of the base 17. On the left-hand end of the shaft 19, outward of the fan casing 10, is a pulley 21 over which runs a belt, not shown, for driving the fan 18 in the direction of the arrows marked thereon in Fig. 1, to deliver a blast of air through the discharge throat 11, elbow 14 and stack 13.

Cooperating with the blast of air travelling through the discharge throat 11, for carrying the grain upward through the stack 13, is a horizontally disposed paddle wheel 22 that extends transversely over the top of the discharge throat 11. The paddles or blades of this paddle wheel 22 are backwardly curved in respect to their direction of travel, as indicated by arrows marked thereon in Fig. 1, for a purpose that will presently appear. The paddle wheel 22 is mounted in a housing 23 on a shaft 24 journaled in bearings on the sides of said housing. This housing 23 is carried on the discharge throat 11 and its top is on a curve, the center of which is at the axis of the paddle wheel 22, so that the blades of said wheel are closely positioned to the top. The bottom 25 of the housing 23 forms a part of the top of the discharge throat 11 and is in the form of a plate that extends obliquely upward and rearward from under the paddle wheel 22. This bottom plate 25 has its rear end secured to the housing 23 by hinges 26, for radial swinging movement into the discharge throat 11 in respect to the paddle wheel 22. The free or front end of the bottom plate 25 extends slightly forward of a vertical plane projecting through the axis of the paddle wheel 22, and this portion of said bottom plate is curved to follow the blades of the paddle wheel. The space between the top of the discharge throat 11 and the free end of the bottom plate 25 affords a port 27 through which grain is discharged by the paddle wheel 22 into the discharge throat 11.

Positioning stops 28 limit the swinging movement of the bottom plate 25 toward the paddle wheel 22. The bottom plate 25 is yieldingly held against the positioning stops 28 by a pair of coiled springs 29 compressed between the spring bases 30 on the outside of the discharge throat 11 and the rear ends of a transverse bar 31 that project through vertical slots 32 in the sides of said discharge throat. The bottom plate 25 rests directly on the transverse bar 31 and the springs are held by pockets 33 in the spring bases 30 and transverse bar 31.

The paddle wheel 22 is driven from the fan shaft 19 by a belt 34 that runs over a relatively small pulley wheel 35 on said shaft between the pulley 20 and the respective side of the fan casing 10 and a relatively large pulley 36 on the shaft 24 of said paddle wheel. Co-operating with the belt 34 is a belt tightener 37 on the base 17. Grain is delivered into the housing 23 through a horizontally disposed feed spout comprising an outer imperforate section 38 and an inner perforated or sieve section 39, and which sections are telescopically connected, the inner end of the spout section 38 being secured in a bearing collar 40 that is rotatively mounted in a central opening in a rectangular joint plate 41 and secured thereto against axial movement by a pair of opposing flanges 42. This joint plate 41 is mounted in a rectangular hopper box 43 secured to the left-hand side of the housing 23 and pivoted thereto for angular movements in a vertical plane by a pair of horizontally aligned and diametrically opposite hinge pins 44 journaled in the sides of said box. The oblique bottom of the hopper box 43 slopes toward the housing 23 to deliver grain, under the action of gravity, through an inlet opening 45 in the respective side of said housing back of the paddle wheel 22. To hold the joint plate 41 in different angular adjustments, there are secured to the inner face thereof angle plates 46 adjustably secured to the sides of the hopper box 43 by thumb nut-equipped bolts 47 that extend through slots in said angle plates and apertures in the sides of said hopper box. A joint strip 48 on the lower edge of the joint plate 41 engages the inclined bottom of the hopper box 43 to form a tight joint therewith in all of the angular adjustments of said joint plate. On the inner retaining flange 42 is a pair of diametrically opposite oblique flat agitating fingers 49.

The outer end of the feed spout section 38 is rotatively supported on a roller-equipped concave head 50 carried by a screw-threaded post 51 that extends loosely through a hub on the outer end of a horizontal arm 52. This arm 52 is pivoted at 53 to the base 17 for swinging movement parallel thereto. A nut 54 on the screw-threaded post 51 bears on the upper surface of the hub of the arm 52 and holds said post with its head 50 in different vertical adjustments. Obviously, by adjusting this nut 54 on the post 51, the inclination of the feed spout may be varied, at will. It may be here stated that, in actual practice, a hopper would be attached to the outer end of the sieve section 39. A brace rod 55, detachably secured to the base 17, holds the arm 52 against swinging movement. To agitate grain during its travel through the sieve section 39 and thereby remove the dirt and dust therefrom and also to assist gravity to feed the grain through said sieve and the spout section 38, said spout is rotated by a shaft 56 journaled in bearings 57 on the top of the housing 23. This shaft 56 extends axially into the inner end of the feed spout section 38 and is secured thereto by a spider 58. A universal joint 59 in the shaft 56 permits the required angular adjustment of the feed spout 38—39. The frictional contact between the sieve section 39 and feed spout section 38 will cause said sieve to rotate with the positively rotated spout section 38. The shaft 56 is driven from the paddle wheel shaft 24 by a sprocket chain 60 arranged to run over a relatively small sprocket wheel 61 on the paddle wheel shaft 24 and a relatively large sprocket wheel 62 on the shaft 56.

Working back of the paddle wheel 23 is an agitator 63 having spiral blades, and which agitator extends parallel to said paddle wheel and is driven in the same direction by a sprocket chain 64 that runs over a relatively large sprocket wheel 65 on the paddle wheel shaft 24 and a relatively small sprocket wheel 66 on the shaft of said agitator.

In the top of the housing 23, at the back thereof, is a vent 67 from which leads a damper-equipped pipe 68.

The sides of the housing 23 are outwardly offset at 69 to afford recesses 70 for the springs 29. To set the free end portion of the bottom plate 25 different distances from the paddle wheel 22, I provide set screws 71 having screw-threaded engagement with the tops of the housing offsets 69, and which set screws impinge against the top of the cross bar 31 to hold the same against the tension of the springs 29. The purpose of this adjustment is to increase the capacity of light fluffy grains passing between the blades of the paddle wheel 22 and the bottom plate 25.

The operation of the above described pneumatic elevator may be briefly described as follows:

The undershot fan 18 delivers a blast of air into the discharge throat 11 and that part of the blast of air having the greatest velocity moves over the deck 12 and strikes the lower portion B thereof obliquely, as indicated by arrows marked thereon in Fig. 1. Grain is fed into the feed spout by means of a hopper, not shown, and while moving through the sieve section 39, dust and dirt is removed therefrom under the rotation of said feed spout, and which rotation also causes the grain to move through the feed spout section 38 from which it is precipitated onto the inclined bottom of the hopper box 43. From thence the grain moves under the action of gravity into the housing 23 through the outlet opening 45, and at which time it is acted on by the agitator fingers 49. The grain in the housing 23 is acted on by the spiral blades of the agitator 63 and moved thereunder and downward on the inclined bottom plate 25 to the paddle wheel 22. From thence the movement of the grain on the inclined bottom plate 25 is contained by the action of the backwardly curved blades of the paddle wheel 22 thereon and moved to the outer edge portion of said bottom plate, and from thence it is thrown by said blades through the port 27 and into the blast of air moving through the discharge throat 11.

The backwardly curved blades of the paddle wheel 22 are highly important for the reason that they draw out of the grain at the time the same is discharged through the port 27, and it is possible with this form of blade to drive the paddle wheel 22 at a relatively high speed for the reason that there is no danger of carrying grain thereover.

Due to the different specific gravity of the grain in the housing, a separation thereof takes place, at the time the grain is thrown by the paddle wheel 22 into the discharge throat 11, and in which separation the grain settles to different depths in the discharge throat 11, and the heaviest of said grain is carried just over the deck 12 by that portion of the blast of air having the greatest velocity. This separation of the grain is highly important as it materially increases the capacity of the elevator as the grain is carried through the entire transverse area of the discharge throat 11 and takes much less power to move the same.

The upwardly inclined deck 12 is highly important for the reason that the blast of air from the fan strikes the same obliquely and thereby easily moves any deposit of grain thereon. In case the grain starts to pile up on the deck 12, the blast of air from the fan will move the same, first by picking up the grain farthest away and carrying the same through the discharge throat 11 to the stack 13 until the entire pile is removed. This piling of grain takes place due to various different causes. For instance, in case the elevator is operated by an explosive engine and the speed dies down sufficiently to reduce the blast of air and thus allow a portion of the grain to be precipitated onto the deck 12, or a stick, nail or other foreign matter will often cause the grain to pile up; but owing to the peculiar shape of my deck, the grain will never pile up so high as to entirely choke the discharge throat 11 during the operation of the elevator. By making the deck 12 flat, the grain passing thereover or thereon is kept spread out to the full width of the discharge throat and, hence, can be much more easily moved by the blast of air and with an increased capacity than if the deck were made concave. In case the grain piles up on the deck 12 sufficiently to entirely choke the discharge throat, which might take place when the machine is stopped, this grain can be removed sufficiently to allow the blast of air to pass thereover by opening the sliding gate 16 and allowing a portion of the grain to flow outward through the release opening 15.

The purpose of the vent 67 is to release any back pressure that may be produced in the stack 13 and carried into the housing 23 by the blades of the paddle wheel 22. Without this vent, the movement of light grains would be materially retarded by back pressure.

In case a piece of foreign matter gets into the housing 23, such as a nail, piece of metal or a stick, and passes under the paddle wheel 22, the bottom plate 25 will yield and allow said foreign matter to be discharged into the discharge throat 11 without damaging the elevator or affecting the operation thereof. As soon as the foreign matter has passed from the bottom plate 25, it will be immediately returned to normal position by the spring 29. By operating the hand screws 71, the bottom plate 25 may be adjusted radially toward or from the paddle wheel 22 to adjust the machine for different kinds of materials to be elevated.

The above described pneumatic elevator has, in actual usage, proven highly efficient for the purpose had in view.

What I claim is:

1. In a pneumatic elevator, the combination with a fan casing having a discharge throat, the bottom of which is upwardly inclined away from the bottom of said casing to afford a deck, of a stack leading from said discharge throat, an undershot fan mounted in said casing and arranged to deliver a blast of air through the discharge throat, the greater volume of which travels over said upwardly inclined deck, said discharge throat having a port at its top, and means for discharging grain through said port and into the blast of air from the fan, the inclination of said deck being progressively greater from the bottom of the casing to a point above said port.

2. In a pneumatic elevator, the combination with a fan casing having a discharge throat, the bottom of which is upwardly inclined away from the bottom of said casing to afford a deck, of a stack leading from said discharge throat, an undershot fan mounted in said casing and arranged to deliver a blast of air through said discharge throat, the greater volume of which travels over said upwardly inclined deck, a paddle wheel housing having a discharge port opening into the top of the discharge throat, and a revoluble paddle wheel mounted in said housing and arranged to deliver grain through said port and into the blast of air, said deck having an inclination that is progressively greater from the bottom of the casing to a point above the bottom of the paddle wheel housing.

3. In a pneumatic elevator, the combination with a fan casing having a discharge throat, the bottom of which is upwardly inclined away from the bottom of said casing to afford a deck, of a stack leading from said discharge throat, an undershot fan mounted in said casing and arranged to deliver a blast of air through said discharge throat, the greater volume of which travels over said upwardly inclined deck, a paddle wheel housing having a discharge port opening into the top of the discharge throat, and a revoluble paddle wheel mounted in said housing and arranged to deliver grain through said port and into the blast of air, said paddle wheel housing having a yielding bottom plate forming a section of the discharge throat and arranged to move toward and from said paddle wheel housing.

4. The structure defined in claim 3 in further combination with adjustable means for limiting the movement of the bottom plate toward the paddle wheel.

5. In a pneumatic elevator, the combination with a fan casing having a discharge throat, the bottom of which is upwardly inclined away from the bottom of said casing to afford a deck, of a stack leading from said discharge throat, an undershot fan mounted in said casing and arranged to deliver a blast of air through said discharge throat, the greater volume of which travels over said upwardly inclined deck, a paddle wheel housing having a discharge port opening into the top of the discharge throat, and a revoluble paddle wheel mounted in said housing and arranged to deliver grain through said port and into the blast of air, said paddle wheel housing having a bottom plate hinged at its rear edge for swinging movement into the discharge throat, the front edge of said bottom plate forming the lower edge of the discharge port, in further combination with yielding means holding the bottom plate in normal position.

6. In a pneumatic elevator, the combination with a fan casing having a horizontally disposed discharge throat, of a stack leading from said throat, a fan mounted in said casing and arranged to deliver a blast of air through said throat and into the stack, a paddle wheel housing having a hinged bottom plate arranged to swing radially away from the paddle wheel, positioning stops for said bottom plate, a cross bar supporting said bottom plate and projecting through vertical slots in the sides of said throat, and springs acting on the outer ends of said bar to yieldingly hold the bottom plate against the positioning stops.

7. In a pneumatic elevator, the combination with a fan casing having a horizontally disposed discharge throat, of a stack leading from said throat, a fan mounted in said casing and arranged to deliver a blast of air through said throat and into the stack, a paddle wheel housing having a hinged bottom plate arranged to swing radially away from the paddle wheel, positioning stops for said bottom plate, a cross bar supporting said bottom plate and projecting through vertical slots in the sides of said throat, spring bases on the sides of said throat, and coiled springs compressed between the ends of said bar and spring bases and yieldingly holding said bottom plate against the positioning stops.

8. In a pneumatic elevator, the combination with a stack, of a fan arranged to deliver a blast of air through the stack, a housing forward of the fan, a paddle wheel mounted in the housing radially forward of the fan, an agitator mounted in said housing radially rearward of the paddle wheel, and means for driving the paddle wheel and agitator in the same direction, said agitator being arranged to move grain thereunder on the bottom of said housing and deliver the same under the paddle wheel which continues said movement of the grain on the bottom of the housing and discharges the same into the blast of air from the fan.

9. In a pneumatic elevator, the combination with a stack, of a fan arranged to deliver a blast of air through the stack, a paddle wheel housing, a paddle wheel journaled in said housing, means for driving the paddle wheel in a direction to deliver grain into the stack, an agitator working in said housing directly back of the paddle wheel and arranged to feed grain to the paddle wheel, said paddle wheel and agitator being rotated in the same direction and arranged to move the grain thereunder and on the bottom of said housing, and a vent stack leading from the paddle wheel housing back of the agitator.

10. In a pneumatic elevator, the combination with a stack, of a fan arranged to deliver a blast of air through the stack, a paddle wheel housing, a paddle wheel journaled in said housing, means for driving said paddle wheel in a direction to deliver grain into the stack, a hopper box arranged to discharge into the paddle wheel housing, a feed spout having at one end a joint plate mounted in the hopper box for angular movement and closing the same except for said feed spout, and a vertically adjustable support for the other end of the feed spout.

11. In a pneumatic elevator, the combination with a stack, of a fan arranged to deliver a blast of air through the stack, a paddle wheel housing, a paddle wheel journaled in said housing, means for driving the paddle wheel in a direction to deliver grain into the stack, said housing having a movable bottom plate, and means for adjusting said bottom plate toward and from the paddle wheel.

12. The structure defined in claim 11 in which the movable bottom plate is yieldingly held.

In testimony whereof I affix my signature.

TIMOTHY C. VAUGHN.